(12) United States Patent
Schutten et al.

(10) Patent No.: US 8,324,980 B2
(45) Date of Patent: Dec. 4, 2012

(54) ELECTROMAGNETIC INTERFERENCE MITIGATION SYSTEM AND METHOD

(75) Inventors: Michael Joseph Schutten, Rotterdam, NY (US); Rajib Datta, Niskayuna, NY (US); Joseph Taher Mossoba, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 807 days.

(21) Appl. No.: 12/394,089

(22) Filed: Feb. 27, 2009

(65) Prior Publication Data

US 2010/0219902 A1 Sep. 2, 2010

(51) Int. Cl.
*H04B 3/32* (2006.01)
(52) U.S. Cl. ........... 333/12; 333/181; 333/184; 333/185
(58) Field of Classification Search .................... 333/12, 333/181, 184, 185
See application file for complete search history.

(56) References Cited

U.S. PATENT DOCUMENTS

| | | | | |
|---|---|---|---|---|
| 4,914,383 | A | * | 4/1990 | Wilkerson ..................... 324/127 |
| 5,109,206 | A | * | 4/1992 | Carlile .......................... 333/177 |
| 5,969,583 | A | | 10/1999 | Hutchison |
| 6,636,107 | B2 | | 10/2003 | Pelly |
| 6,788,558 | B2 | | 9/2004 | Pelly |
| 6,842,069 | B2 | | 1/2005 | Takahashi et al. |

OTHER PUBLICATIONS

Daniel Cochrane, Dan Y. Chen; Passive Cancellation of Common-Mode Noise in Power Electronic Circuits; pp. 756-763; IEEE Transactions on Power Electronics, vol. 18, No. 3, May 2003.

* cited by examiner

*Primary Examiner* — Robert Pascal
*Assistant Examiner* — Kimberly Glenn
(74) *Attorney, Agent, or Firm* — Scott J. Asmus

(57) ABSTRACT

A device to attenuate EMI between a source and a load is provided. The device includes a first cable to electrically couple the source and the load and a second cable positioned adjacent to the first cable and configured to attenuate a common-mode current.

18 Claims, 5 Drawing Sheets

ELECTROMAGNETIC INTERFERENCE MITIGATION SYSTEM AND METHOD

BACKGROUND

The invention relates generally to electromagnetic interference and in particular, to reduction of common-mode noise.

Electronic devices may experience serious operating difficulties when subjected to unintended electromagnetic noise. Electromagnetic noise that interferes with the normal operation of a device, is generally known as electromagnetic interference (EMI). In order to ensure the reliable operation of electronic devices it is desirable that EMI be reduced to a minimum.

The manner in which EMI is suppressed is dependent on the nature of the interference. There are two ways undesirable noise can propagate in signal transmission paths: one is differential-mode interference, and the other is common-mode interference. Differential-mode interference causes the potential on one side of a signal transmission path to be changed with respect to another side. With this type of interference, the interference current path is wholly in the signal transmission path.

Common-mode interference appears between two signal transmission paths and a common reference plane (ground), and causes the potential of both sides of the transmission path to be changed simultaneously and by the same amount relative to the reference plane. Common-mode noise may be caused by an electric (capacitive) or magnetic (inductive) field when interference is induced in both signal transmission paths equally. Noise voltages developed may be the same in both transmission paths.

Common-mode filtering typically uses multiple filter assemblies in series to achieve the desired filtering wherein additional multiple filter assemblies contribute to additional cost, increase size and weight of the total filter assembly which is especially disadvantageous for volume and weight constrained applications. Further, working environments wherein aerospace applications require substantial attenuation of common-mode noise in multiple conductors with reduced weight and size. The common-mode performance of the filters is not sufficient.

Therefore, it is desirable to provide an apparatus that is capable of attenuating common-mode noise with decreased weight and minimal environmental impact.

BRIEF DESCRIPTION

Briefly, a device to attenuate EMI between a source and a load is provided. The device includes a first cable to electrically couple the source and the load and a second cable positioned adjacent to the first cable and configured to attenuate a common-mode current.

In one embodiment, a device to attenuate EMI between a source and a load is provided. The device includes an un-shielded cable to electrically couple the source and the load. An attenuation cable is positioned adjacent to the first cable and a clamp-on core is coupled to the un-shielded cable and the attenuation cable. The device further includes a common-mode filter coupled to the un-shielded cable wherein at least one of the attenuation cable, the clamp-on core and the common-mode filter is configured to mitigate a common-mode noise.

In one embodiment, a system to mitigate electromagnetic interference is presented. The system includes a source and a load coupled via a first cable to carry a load current, a second cable coupled between the source and the load and disposed adjacent to the first cable. The second cable is configured to provide common-mode noise attenuation by providing an alternate path for a common-mode current to flow.

In one embodiment, a system to mitigate electromagnetic interference is provided. The system includes a source and a load coupled via a first cable to carry a current, a second cable coupled between the source and the load and disposed adjacent to the first cable, a common-mode filter coupled to the first cable, and a clamp-on core coupled to the first cable and the second cable. At least one of the second cable, the common-mode choke and the clamp-on core is configured to provide common-mode noise attenuation by providing an alternate conduction path to a common-mode current.

In one embodiment, a method to attenuate EMI between a source and a load is proposed. The method includes providing an alternate path for a common-mode noise, providing an attenuation electrical wire(s) or cable to eliminate a shield, coupling a common-mode filter between the source and the load, disposing a clamp-on core on the attenuation electrical wire(s) or cable and attenuating the common-mode noise.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
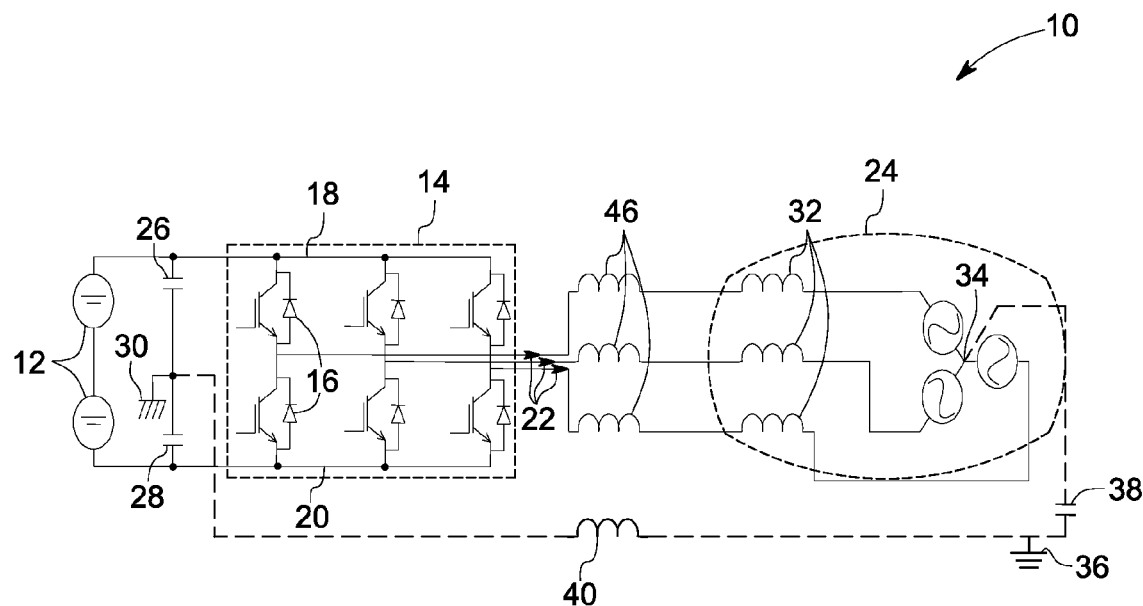
FIG. 1 illustrates simplified equivalent circuit of a power system having a three phase inverter supplying power to a motor load.

FIG. 1 illustrates a simplified schematic of a power system having an inverter supplying power to a load. In an exemplary embodiment, a power system 10 includes a direct current (DC) source 12 coupled to an inverter 14 having multiple switching devices 16 coupled between DC bus 18 and 20. Examples of switching devices include MOSFET, FET, insulated bipolar junction transistor (IGBT), and the like. The inverter 14 supplies a load current 22 to an AC motor 24. Capacitors 26, 28 are coupled respectively between DC bus 18, 20 and a first ground node 30. The motor 24 includes motor windings 32 coupled together at a neutral point 34. The neutral point 34 is coupled to a second ground node 36 through a parasitic capacitance 38 that may exist between the motor windings 32 and the environment as illustrated by reference numeral 38. Generally the parasitic capacitance 38 is coupled between the second ground node 36 and the motor neutral 34. It may be appreciated that an equivalent parasitic inductance 40 may be coupled between the first ground node 30 and second ground node 38. Physical geometry and positioning of the inverter 14, motor 24, and surroundings may substantially influence the value of such parasitic elements 38, 40.

Figure 2:
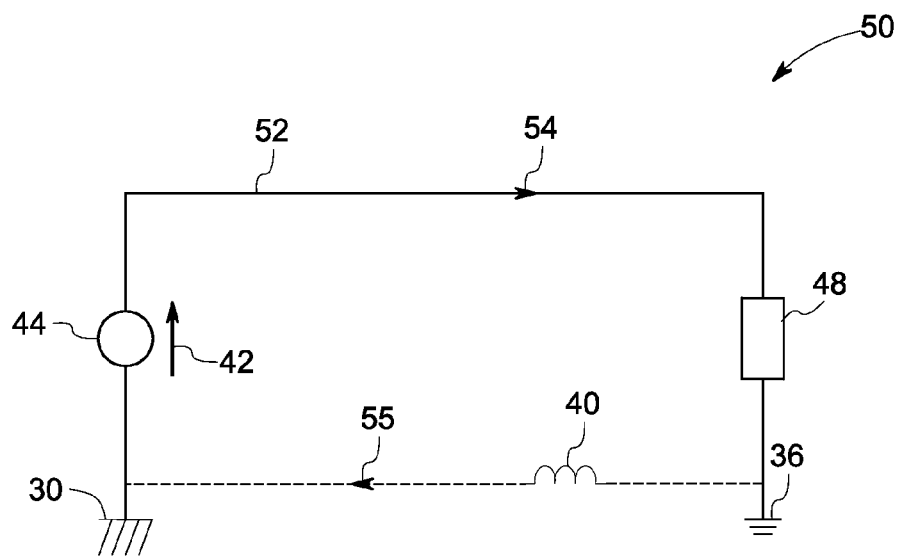
FIG. 2 illustrates a common-mode equivalent circuit of FIG. 1.

FIG. 2 illustrates a common-mode equivalent circuit of FIG. 1. A common-mode output voltage 42 of the inverter 14 is represented by a voltage source 44. The common-mode output voltage 42 of the inverter 14 is an average of the inverter's individual phase voltages. In one embodiment, inductance of the motor windings 32, line inductance 46 (See FIG. 1), and parasitic capacitance 38 may be represented as a common-mode load impedance 48. The common-mode equivalent circuit 50 includes a wire/cable 52 coupling the common-mode voltage source 44 and the common-mode load impedance 48. The cable 52 may include a single conductor of a given diameter, wherein the current carrying requirement dictates the diameter. In one embodiment, the wire 52 may include multiple strands of electrical conductors bundled together. The voltage source 44 is coupled to the first ground node 30. Similarly, the load impedance 48 is coupled to the second ground node 36. Parasitic elements such as parasitic inductance 40 may exist between the first ground node 30 and the second ground node 36. A path of minimum impedance for a common-mode current 54 may exist between the ground nodes 30, 36. During an operation, the voltage source 44 directs the common-mode current 54 to the load 48 via the wire 52. As will be appreciated by one skilled in the art, common-mode current 55 between the ground nodes 30, 36 may create an unwanted potential difference (noise) between ground nodes 30 and 36. It is desirable to minimize common-mode current 55 returning along the grounding network between ground nodes 30, 36, thereby minimizing EMI emission and susceptibility.

Figure 3:
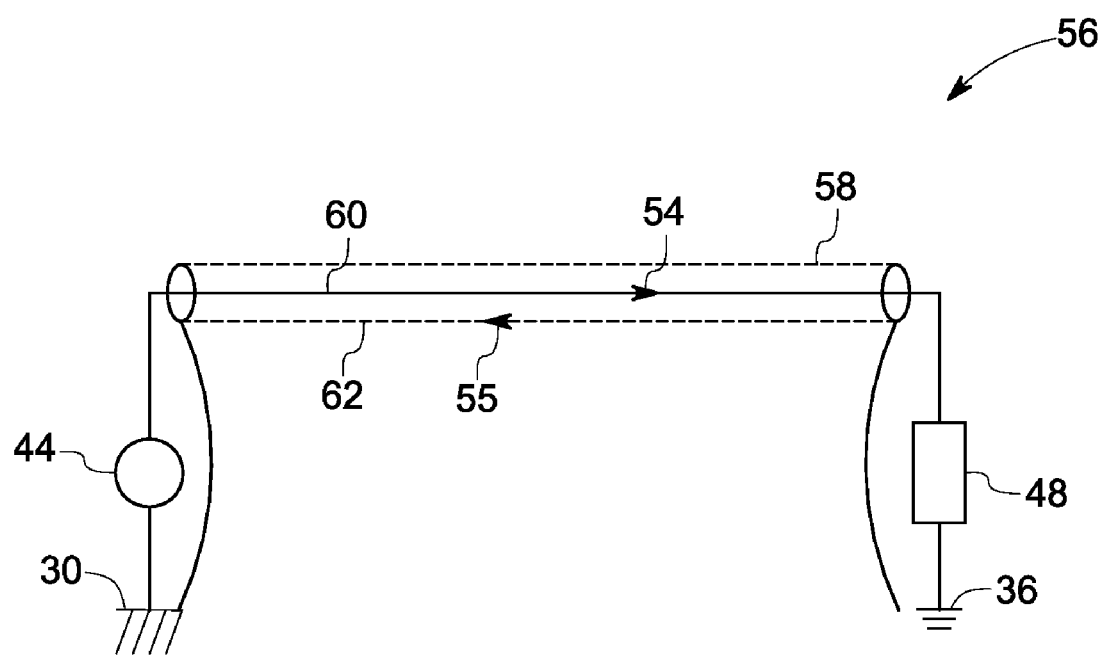
FIG. 3 illustrates a shielded cable system of FIG. 2.

FIG. 3 illustrates a shielded cable system of FIG. 2. In the shielded cable system 56, to minimize the common-mode noise between ground nodes 30 and 36 as described above, a shielded cable 58 is coupled between the common-mode voltage source 44 and the common-mode load impedance 48. The cable 58 includes an inner conductor 60 and a cable shield 62. The cable shield 62 is electrically coupled to the first ground node 30 on the source side, and to the second ground node 36 on the load side. During an operation, the common-mode current 54 flows through the inner conductor 60 between the common-mode voltage source 44 and the common-mode load impedance 48. The common mode current 55 returns through the minimum impedance return path between the ground nodes 30 and 36 via the cable shield 62. Such an arrangement prevents the common-mode current 55 from flowing along the grounding network path, thus eliminating the unwanted noise (potential difference) between ground nodes 30 and 36 reducing EMI emission and susceptibility.

However, implementing such cable shield connection in power systems may be difficult to practice. For example, in aerospace applications, wherein the shielded cable between various components may contribute to significant weight of the overall electrical circuitry, or limit heat transfer from inside the cabling to the ambient environment. Further, due to constantly changing environment within an aircraft, such as change in temperature and pressure over different altitude, shielded cable may degrade faster, augmenting the maintenance economics of the aircraft apart from the environmental concerns that may arise due to moisture entrapment within the shielded cable. Other embodiments of the present invention are intended to overcome the disadvantages of the cable shield by introducing an alternate path for the common-mode currents.

Figure 4:
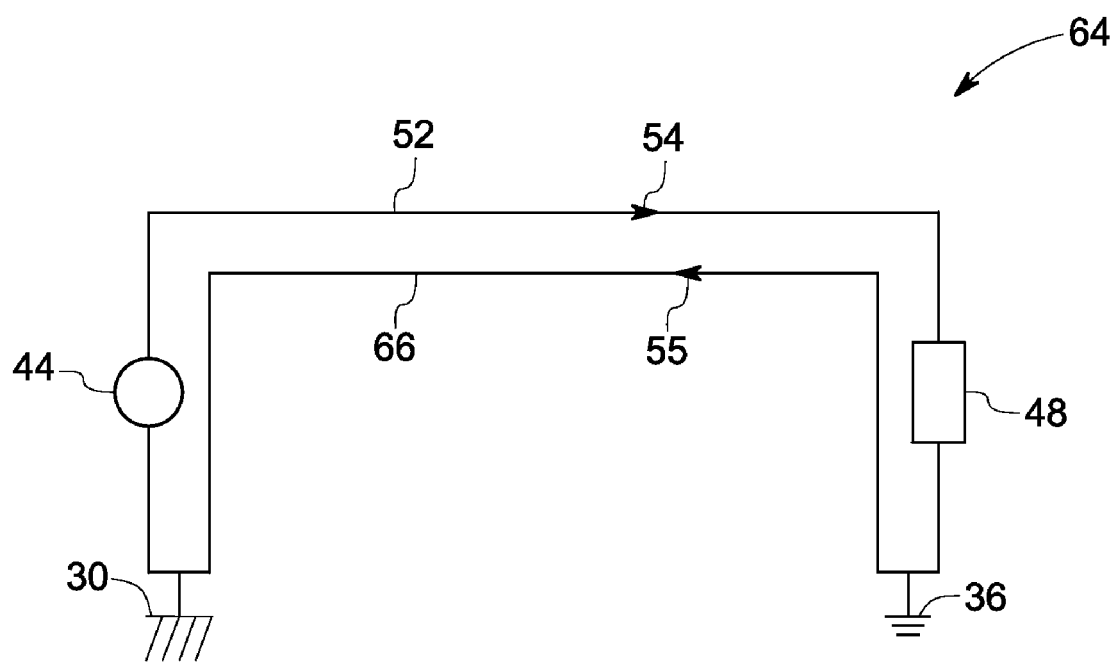
FIG. 4 illustrates a common-mode equivalent circuit implementing an alternate path for common mode current.

FIG. 4 illustrates a common-mode equivalent circuit implementing an alternate path for common mode current. As discussed above, in applications wherein the cable shield is not practical to implement, an alternate embodiment is provided by way of an added wire. The common-mode equivalent circuit 64 illustrates a common-mode voltage source 44 coupled to the common-mode load impedance 48 through an unshielded cable 52. In an exemplary embodiment, the common-mode voltage source 44 is coupled to the first ground node 30 and the common-mode load impedance 48 is coupled to the second ground node 36. An added second wire 66 is coupled between the ground nodes 30, 36. The added second wire 66 may comprise a single conductor or a multi-strand conductor or multiple conductors. It may be noted that the current carrying capability of the second wire 66 may be lower than the first wire 52 that carries the bulk of the load current. In operation, the common-mode voltage source 44 gives rise to common mode load current 54 that flows to the common-mode load impedance 48 via the first wire 52. As discussed earlier, if the minimum impedance return path is along the grounding network path, potential differences may be developed due to the presence of parasitic elements, creating a potential difference between the first ground node 30 and the second ground node 36. Ideally, a zero potential difference is desired between the ground nodes 30, 36. However, the return common-mode current 55 may find a path of least impedance through the second wire 66. In one embodiment, alternate path of least impedance is provided for the common-mode current 55 by re-routing the current 55 through second wire 66. The alternate path eliminates the need for a cable shield. However, without the cable shield or the second wire, the common-mode current would flow through the voltage source 44 via parasitic elements causing a noise along with the flow of load current 22. The terms "first wire," "second wire," and "added wire," as the terms are used herein, are intended to denote an electrical coupling between various components of the power system to perform the tasks of the invention. The term "wire" is intended to denote any electrical cable or multiple electrical conductors capable of conducting current during an operation of the power system.

Figure 5:
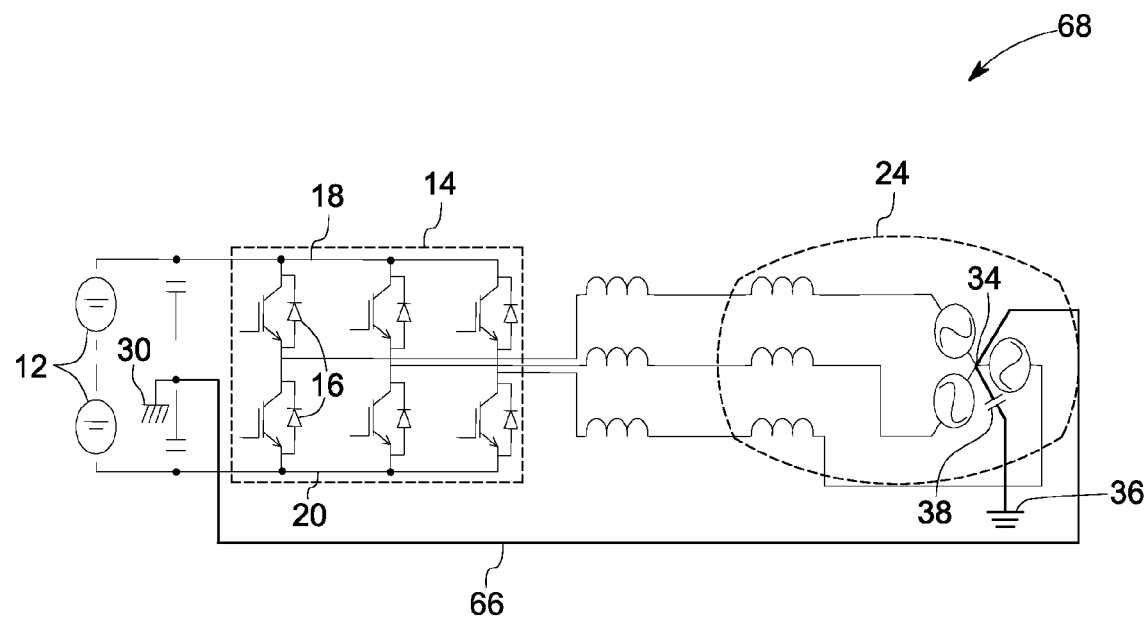
FIG. 5 illustrates a power system implementing the alternate path for common mode current of FIG. 4.

FIG. 5 illustrates a power system implementing the alternate path for common mode current. The illustrated schematic of power system 68 implements the alternate path for common-mode current as discussed in the common-mode equivalent circuit of FIG. 4. The power system 68 includes a power source 12 supplying power to an inverter 14. Multiple switches 16 are arranged between the DC bus 18 and 20 and configured to switch in an organized scheme. The output of the inverter 14 may include three phase AC voltage supplying a load current 22, for example, to a motor load 24. The power system 68 includes a first ground node 30 on the inverter input side and a second ground node 36 coupled to the motor neutral 34 through parasitic capacitance 38. Typically, a potential difference may exist between the first ground node 30 and the second ground node 36 due to common-mode current that may flow between the ground nodes 30, 36 via parasitic elements and interfere with the operation of the inverter 14. However, in one embodiment, an alternate path for the returning common-mode current 55, is implemented via a fourth wire 66 coupled between the first ground node 30 and the second ground node 36. The fourth wire 66 provides a least impedance path to the returning common-mode current 55. Such added wire provides advantages of eliminating the need for a cable shield in three phase cable system. Further, common-mode filters may be implemented within the system in conjunction with the added wire to increase the efficiency of common-mode mitigation within the power system 68. An experimental setup having an exemplary scheme of implementing the added wire in the power system is discussed in FIG. 6

Figure 6:
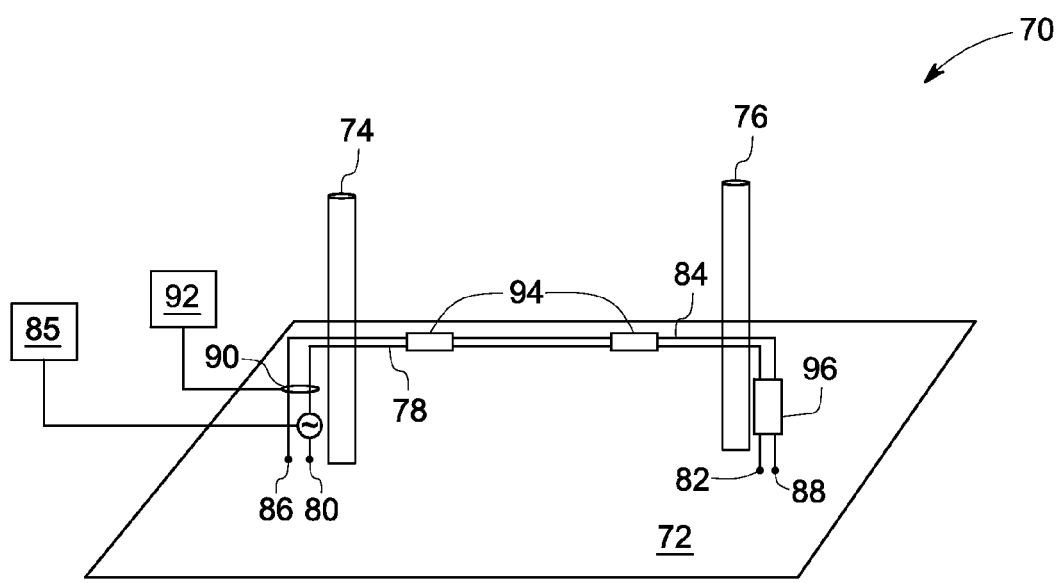
FIG. 6 illustrates an experimental setup implementing an alternate path for common-mode currents.
Figure 9:
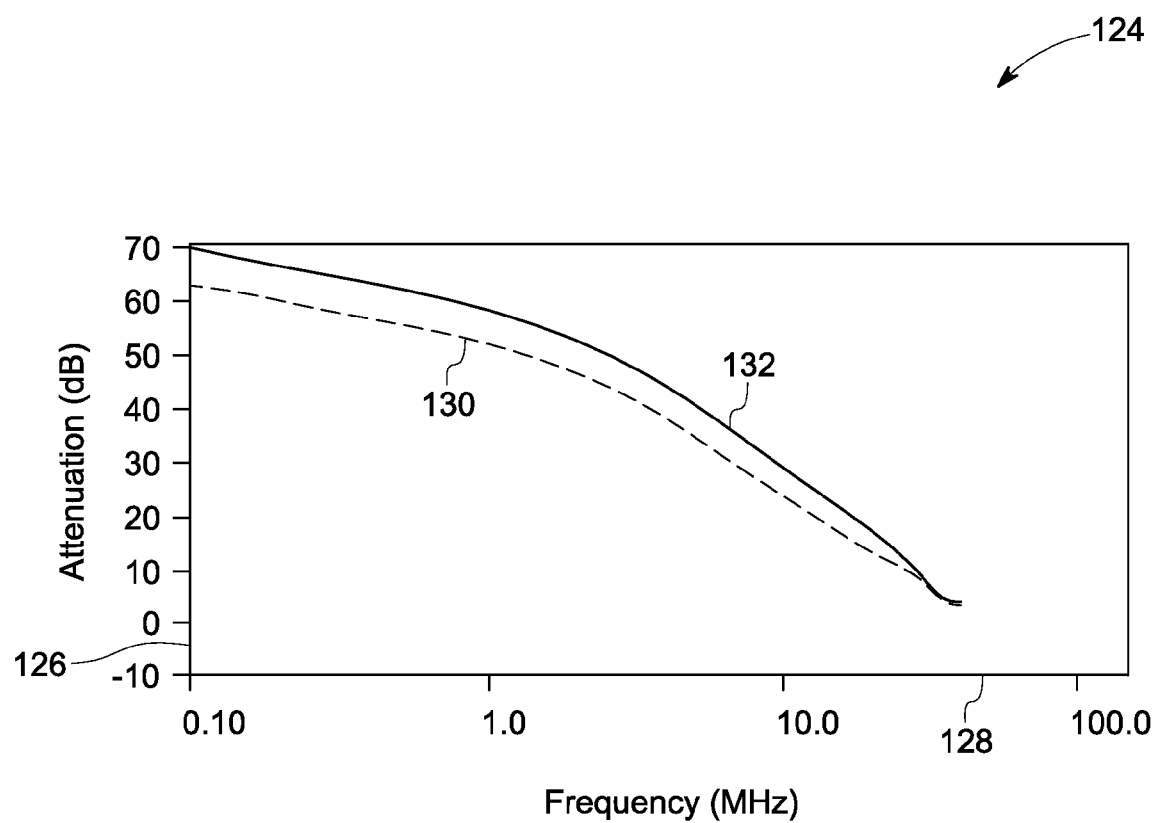
FIG. 9 illustrates an exemplary attenuation profile with the common-mode filter.

FIG. 6 illustrates an experimental setup implementing an alternate path for common-mode currents. The experimental setup 70 includes a base generally made of an electrically conductive sheet 72 (e.g. aluminum) that represents the grounding network. Insulating posts 74 and 76 are mounted on the aluminum sheet 72 to support routing of connecting cables. A first wire 78 is bonded on to the aluminum sheet 72 at 80. A high frequency amplifier 85 is coupled to the first wire 78, wherein the amplifier 85 represents a common-mode noise source. The first wire 78 may include a single conductor of a given diameter, wherein the current carrying requirement dictates the diameter. In one embodiment, the first wire 78 may include multiple strands of electrical conductors bundled together. In an exemplary embodiment, the high frequency amplifier 85 is configured to inject high frequency current in the range of about 100 kHz to about 30 MHz. The first wire 78 is bonded the aluminum sheet 72 at the far end 82. Further, a second wire 84 is disposed adjacent to the first wire 78 and bonded on to the aluminum sheet 72 at 86 and 88. A current sensor 90 (or a current transformer) is coupled to the first wire 78 and the second wire 82 and a spectrum analyzer 92 is coupled to the current sensor 90 to measure a frequency response. In one embodiment, clamp-on ferrite cores 94 are disposed onto the first wire 78 and the second wire 84. The placement of ferrite core 94 creates magnetic coupling. Such magnetic coupling provides an alternative path for the common-mode current to return through the second wire 84 instead of the undesirable path through 72. In another embodiment, a common-mode filter 96 is coupled to the first wire 78. In an exemplary embodiment, the common mode filter 96 is an inductor having a circular magnetic core with one set of windings disposed on each half of the magnetic core. The magnetic core may include, for example, materials such as ferrite or silicon steel or amorphous material or nano-crystalline material. In one embodiment, the windings may include a bifilar winding around the magnetic core wherein the two wires are twisted between them and wound consistently to spread across the magnetic core. The advantages of bifilar windings are illustrated in FIG. 9. The common-mode filter 96 adds common-mode impedance to the first wire 78, thereby reducing the common-mode current via the first wire 78. In may be noted that coupling the common-mode filter to either a single wire or both of the wires may yield varying results depending on the power system parameters such as operating voltages, currents, actual length of the cables used, for example. In may be prudent to use the common-mode filter coupling in a manner best suited for a given power system.

The high frequency amplifier 85 injects high frequency current during an operation of the experimental setup 70. In an exemplary embodiment, to study the effect of the second wire 84, the experiment is carried out in a sequential manner by (i) providing the first wire only (ii) providing the second wire adjacent to the first wire (iii) providing clamp-on core on the first wire and the second wire (iv) providing a common-mode filter on the first wire with clamp-on core on the first wire and the second wire and (v) providing a common-mode filter on both the first wire and the second wire with clamp-on core on the first wire and the second wire. The results are illustrated in FIGS. 7, 8 showing the change in attenuation as a result of changes in the circuit.

Figure 7:
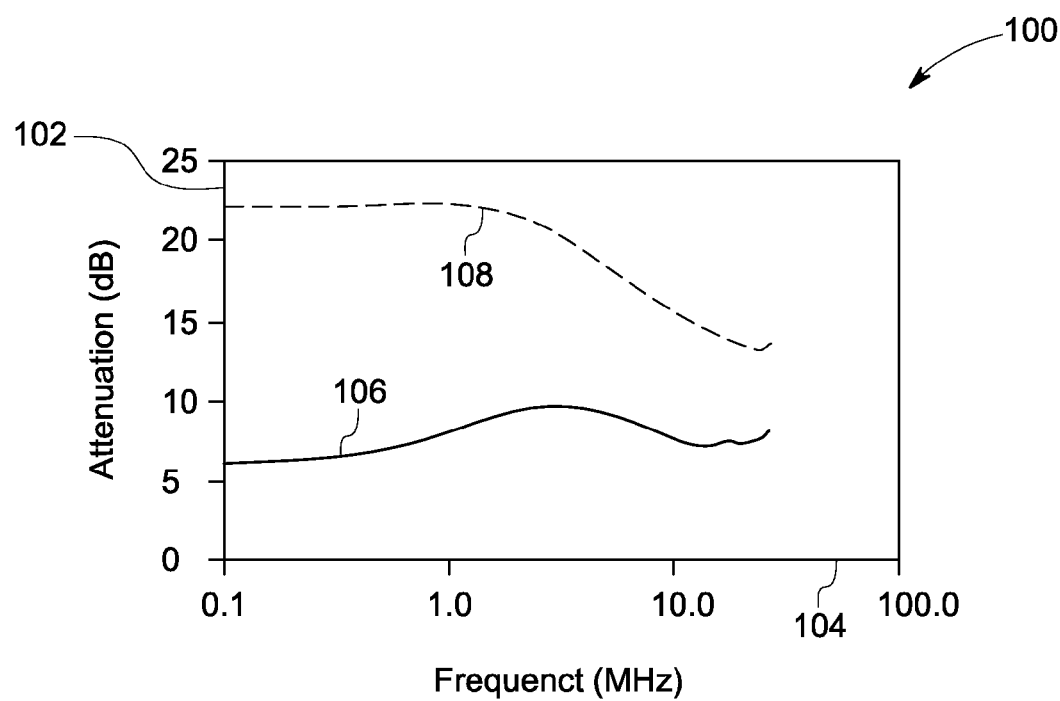
FIG. 7 illustrates an exemplary attenuation profile.
Figure 8:
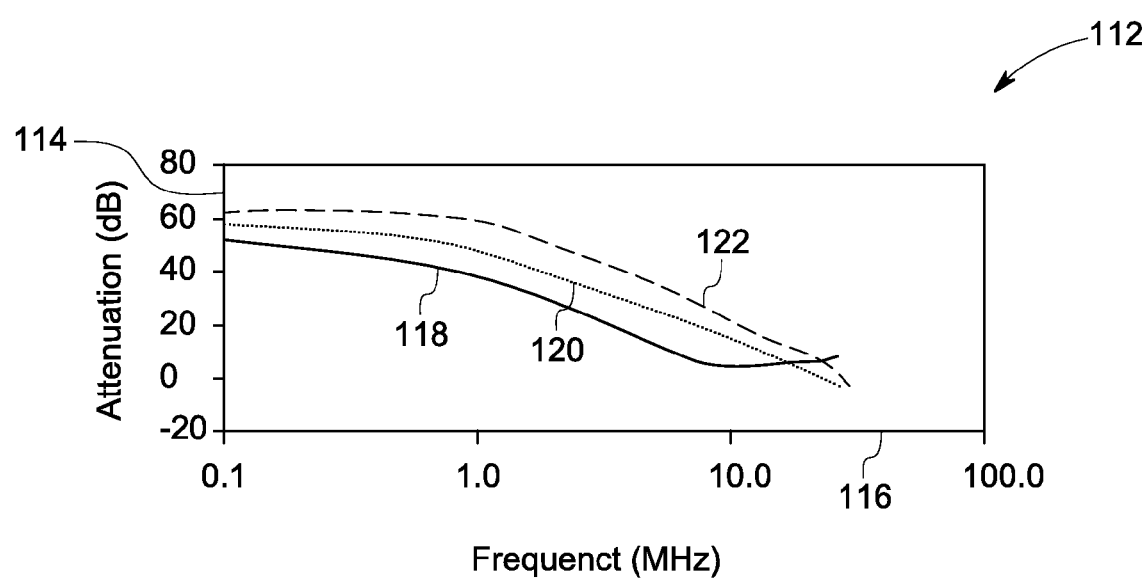
FIG. 8 illustrates an exemplary attenuation profile.

Turning now to FIG. 7, a frequency response plot 100 having an ordinate axis represents attenuation in 102 measured in decibels (dB) and the abscissa axis represents frequency 104 measured in MHz. In the illustrated embodiments, the attenuation profile 106 provides results for (i) only first wire 78 used. The attenuation profile 108 illustrates results for (ii) providing the second wire adjacent to the first wire. It may be noted that, by adding the second wire, the attenuation increased from about 10 dB to about 22 dB at about 1 MHz frequency. Referring to FIG. 8, the ordinate axis represents attenuation in 114 measured in decibels (dB) and the abscissa axis represents frequency 116 measured in MHz. In the illustrated embodiments, the attenuation profile 118 illustrates results for (iii) providing clamp-on core on the first wire (only one wire) coupled to the common-mode filter. The attenuation profile 120 illustrates results for (iv) coupling the common-mode filter on the first wire and the second wire with clamp-on core on the first wire and the second wire. The attenuation profile 122 illustrates results for (v) coupling the common-mode filter on the first wire only with clamp-on core on the first wire and the second wire. Attenuation up to about 60 dB may be achieved at about 1 MHz frequency by providing a second wire adjacent to the first wire, clamp-on core on the first wire and the second wire, and a common-mode filter on the first wire only.

In an exemplary embodiment, the bifilar windings in the common-mode filter have an improved attenuation profile as illustrated in FIG. 9. Referring to FIG. 9, frequency response plot 124 includes the ordinate axis representing attenuation in 126 measured in decibels (dB) and the abscissa axis representing frequency 129 measured in MHz. In the illustrated embodiments, the attenuation profile 130 illustrates results for a normally wound common-mode filter coupled to the first wire. The attenuation profile 132 illustrates results for a bifilar wound common-mode filter coupled to the first wire. It may be noted from the profiles 130 and 132 that increased attenuation of about 10 dB may be achieved at about 1 MHz frequency by implementing a bifilar winding in the inductor used as the common-mode filter 96 as referenced in FIG. 6.

Advantageously, a simple added wire approach may be used to implement added filtering, or to have the same filtering efficacy as a conventional filter at lighter weight. The added wire approach can be used in conjunction with a common-mode filter to provide added filter attenuation thus eliminating heavy and bulky components. Such added wires are simple in construction and lightweight with the added advantage of increased performance common-mode filter. The added wire also helps eliminate environmental, weight, and reliability concerns.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A device to attenuate electromagnetic interference (EMI) between a source and a load, the device comprising:
   a first cable to electrically couple the source and the load; and
   a second cable positioned adjacent to the first cable and configured to attenuate a common-mode current, wherein the second cable comprises a small gauge wire.

2. The device of claim 1 further comprising a common-mode filter coupled to the first cable.

3. The device of claim 2, wherein the common-mode filter comprises a bifilar winding.

4. The device of claim 2, wherein the common-mode filter comprises a magnetic core made of ferrite or silicon steel or amorphous material or nano-crystalline material.

5. The device of claim 1 further comprising a clamp-on core coupled to at least one of the first cable and the second cable.

6. The device of claim 5, wherein the clamp-on core comprises ferrite or silicon steel or amorphous material or nano-crystalline material.

7. The device of claim 1, wherein the small gauge wire comprises multiple strands.

8. A device to attenuate EMI between a source and a load, the device comprising:
- an un-shielded cable to electrically couple the source and the load;
- an attenuation cable positioned adjacent to the first cable, wherein the attenuation cable comprises multiple strand small gauge wires;
- a clamp-on core coupled to the un-shielded cable and the attenuation cable; and
- a common-mode filter coupled to the un-shielded cable;
- wherein at least one of the attenuation cable, the clamp-on core and the common-mode filter is configured to mitigate a common-mode noise.

9. The device of claim 8, wherein the un-shielded cable carries load current between the source and the load.

10. The device of claim 8, wherein the attenuation cable is configured to provide an alternate path to the common-mode noise.

11. The device of claim 8, wherein the clamp-on core comprises a ferrite material.

12. The device of claim 8, wherein the common-mode filter comprises a bifilar winding.

13. A system to mitigate electromagnetic interference comprising:
- a source and a load coupled via a first cable to carry a load current;
- a second cable coupled between the source and the load and disposed adjacent to the first cable, wherein the second cable comprises multiple strand small gauge wires, and wherein the second cable is configured to provide a common-mode noise attenuation by providing an alternate path for a common-mode current to flow.

14. The system of claim 13, wherein the first cable is an un-shielded cable.

15. The system of claim 13, wherein the load current comprises at least one of a differential mode current and the common-mode current.

16. The system of claim 13 further comprising clamp-on core coupled to the first cable and the second cable.

17. A system to mitigate electromagnetic interference comprising:
- a source and a load coupled via a first cable to carry a current;
- a second cable coupled between the source and the load and disposed adjacent to the first cable, wherein the second cable comprises a small gauge wire;
- a common-mode filter coupled to the first cable; and
- a clamp-on core coupled to the first cable and the second cable, wherein at least one of the second cable, the common-mode choke and the clamp-on core is configured to provide a common-mode noise attenuation by providing an alternate path to a common-mode current.

18. A method to attenuate EMI between a source and a load, the method comprising:
- providing an alternate path for a common-mode noise;
- providing an attenuation cable to eliminate a shield, wherein the second cable comprises multiple strand small gauge wires;
- coupling a common-mode filter between the source and the load;
- disposing a clamp-on core on the attenuation cable; and
- attenuating the common-mode noise.

* * * * *